United States Patent [19]
Crandell

[11] Patent Number: 5,935,472
[45] Date of Patent: Aug. 10, 1999

[54] FORMED MOLDING TORPEDO DEVICE AND A METHOD FOR MAKING THE SAME

[76] Inventor: Walter Crandell, 3720 Stern Ave., St. Charles, Ill. 60174

[21] Appl. No.: 08/821,879

[22] Filed: Mar. 21, 1997

[51] Int. Cl.⁶ .................................................... H05B 3/06
[52] U.S. Cl. ............................ 219/523; 219/535; 219/544
[58] Field of Search ..................... 219/523, 544, 219/535; 392/488, 489, 497, 498, 503; 425/41, 547, 548, 378.1, 383; 338/229, 242; 222/141.5

[56] References Cited

U.S. PATENT DOCUMENTS 3,970,821   7/1976   Crandell .................. 219/523

FOREIGN PATENT DOCUMENTS 415350   6/1947   Italy .

3-214585   9/1991   Japan .

*Primary Examiner*—Teresa Walberg
*Assistant Examiner*—Vinod D. Patel
*Attorney, Agent, or Firm*—Martin Faier; Faier & Faier P.C.

[57] ABSTRACT

A formed integral heated molding torpedo device for maintaining at a controlled elevated temperature material passing over an exposed surface of the device which has an integral casing containing a resistance wire wound core embedded in heat transfer electrical insulation material, with leads connecting the wire wound core to a source of power exiting from one end of the torpedo device, wherein the torpedo device is bent so that its heat transfer surface is arranged angularly to its end from which the leads exit. The invention also includes steps for making such a heated molding torpedo device.

11 Claims, 5 Drawing Sheets

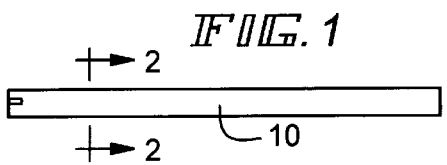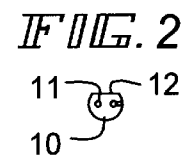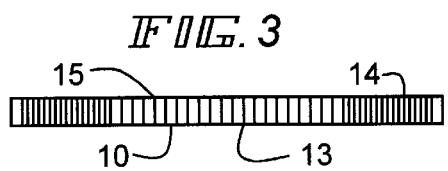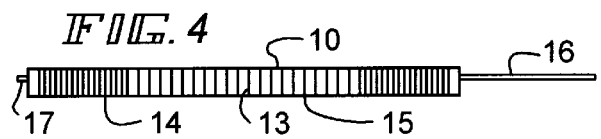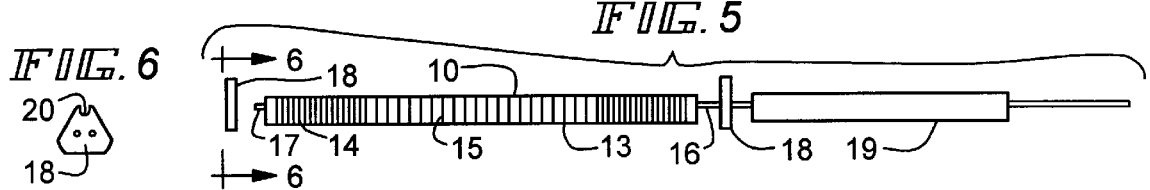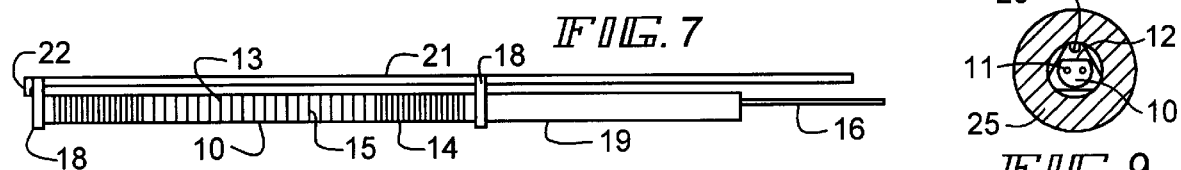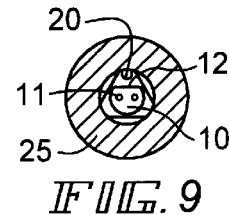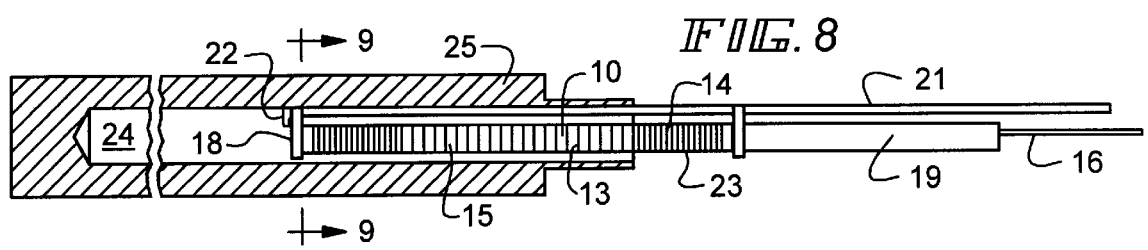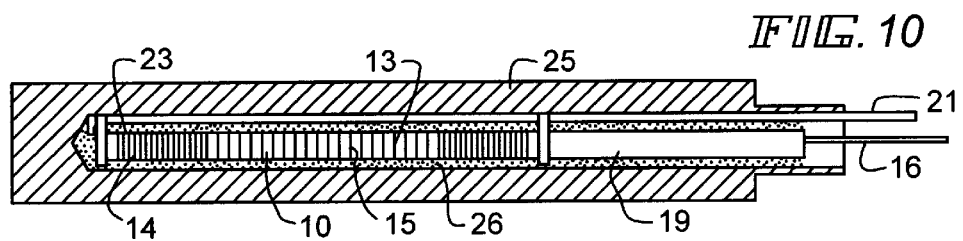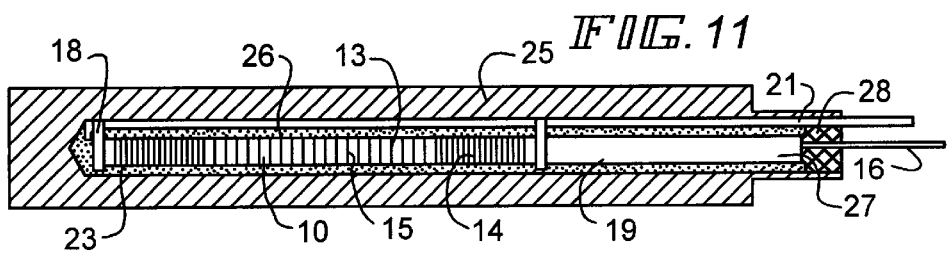

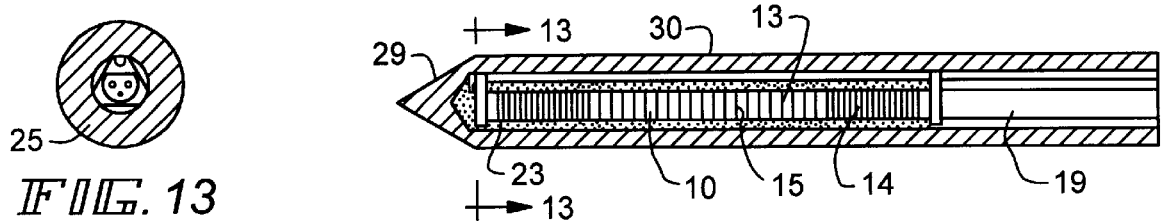
FIG. 13
FIG. 12
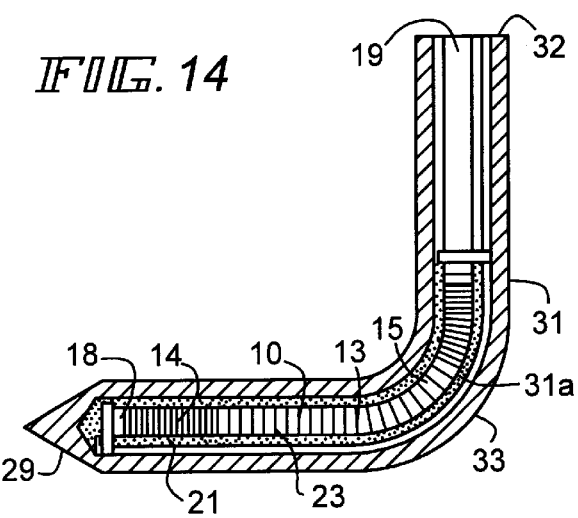
FIG. 14
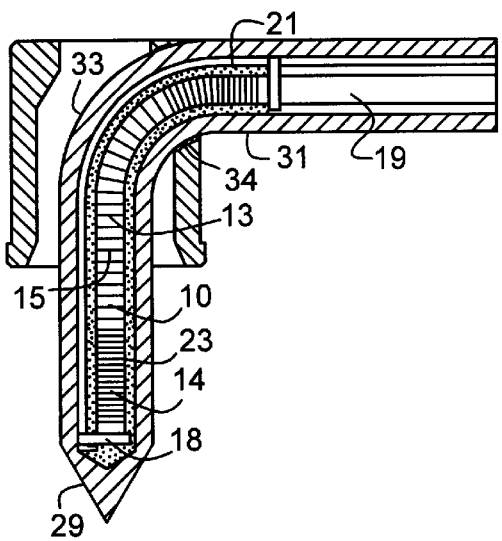
FIG. 15
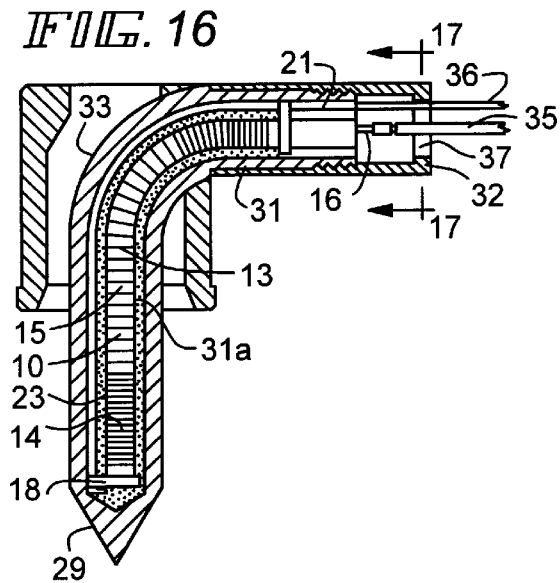
FIG. 16
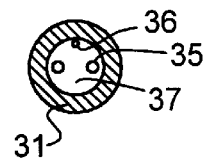
FIG. 17

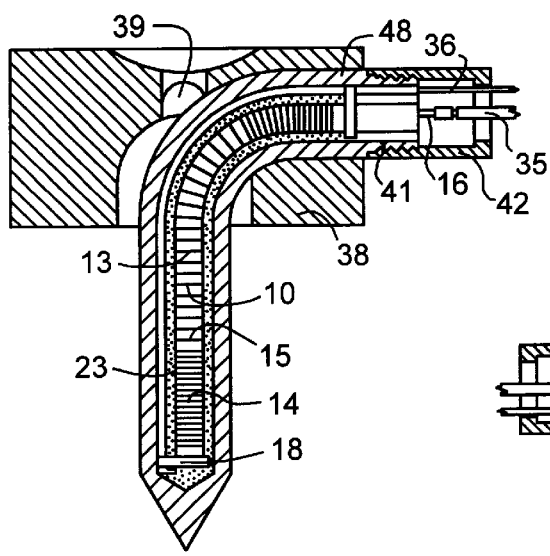
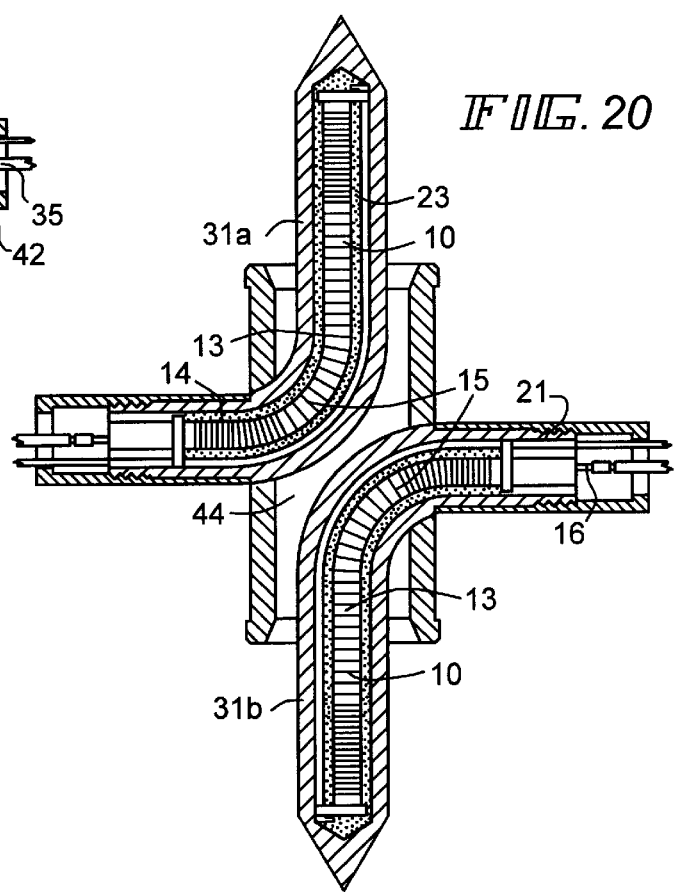
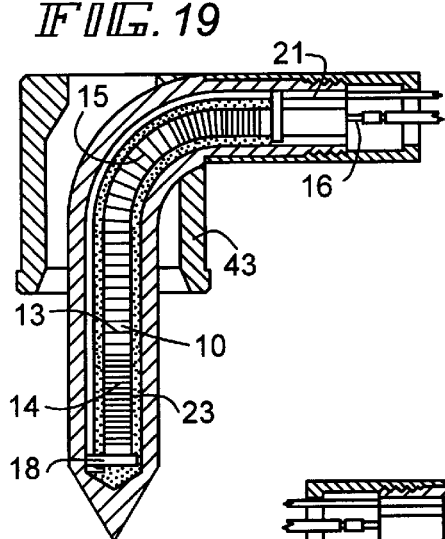
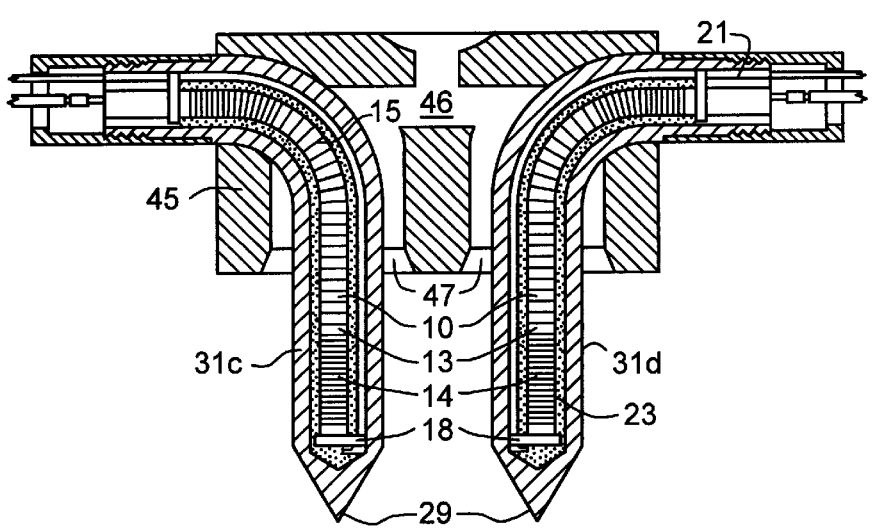

FORMED MOLDING TORPEDO DEVICE AND A METHOD FOR MAKING THE SAME

BACKGROUND AND SUMMARY OF THE INVENTION

This invention relates to a molding torpedo device which can be used in forming plastic and other moldable materials, and the invention also includes a method for making such molding torpedo devices.

THE PRIOR ART

A molding torpedo is an electrically heated spreader device which is inserted into the flow orifice or sprue or into the delivery stream of a plastic or similar molding systems for maintaining and controlling heat applied to the material which is to be molded. Such a torpedo includes an internally electrically heated body integral with a tool steel or similar shell or casing. The internally electrically heated body has a ceramic or similar core about which is wound electrical resistance wire connected to leads extending through the cores projecting outside of the body and connected to a source of electric current. The space inside the casing not occupied by the core and electric components is filled with heat transfer materials, such as magnesium oxide, boron nitride, aluminum oxide or similar material having electrical insulating properties.

The heater-casing assembly is swaged or rolled or similarly compacted and compressed to pulverize the ceramic core materials and fill all voids within the casing, thus making the molding torpedo into a dense, solid integral unit, to afford maximum heat transfer characteristics from the heating element of the molding torpedo to the melt stream. One end of the molding torpedo may be tapered by milling or other forming techniques, performing like a valve in the sprue or similar surface where inserted. The other end of the molding torpedo is closed, by insertion of one or more discs and may be rolled closed, leaving only the leads to exit the molding torpedo body.

Such electrically heated molding torpedo device are shown in Walter R. Crandell U.S. Pat. No. 3,970,821 and 4,120,086. Such devices are only useable in straight runs, and where turns in the melt stream are required, one or more such molding torpedoes are required in an attempt to maintain adequate uniform heating and control at turns of the melt stream, and in many cases a mold must be specially designed to accommodate the delivery situs of the melt stream.

As materials have become more heat sensitive and critical, mold designers desire to make their molds more compact and efficient. Straight torpedoes like those disclosed in U.S. Pat. No. 3,970,821 and 4,120,086 have been shown to limit available molding techniques and mold design. These solid unitary electrically heated molding torpedo devices are capable of withstanding high pressure delivery of the melt stream. However, when such a torpedo device is used alone or associated with other molding torpedo devices or other melt stream heating means, a lack of heat uniformity and control may be noted, because it is not possible to uniformly direct and control delivery of heat in areas of the melt passage not in contact with the heating device, such as where one melt stream passage is disposed angularly to another melt stream passage. With the use of these prior art molding torpedoes, poor heat uniformity is usually exhibited, particularly in the lead area and in heat losses to the head of the molding torpedo.

Other molding systems have sought to overcome this heat loss problem by use of formed runner heaters, for example, see P. A. Cook et al U.S. Pat. No. 3,055,055 issued Sep. 25, 1962, but those systems proved futile and unable to withstand molding pressures because of the construction of the molding torpedo, which comprised a hollow body containing a filler of asbestos wool laid over resistance wires, having no suitable insulation and heat transfer and control characteristics.

THE NEW FORMED MOLDING TORPEDO INVENTION

A novel molding torpedo device formed according to the present invention displays great utility, making it possible to use and design new and more efficient mold designs, available for use with the most modern and sophisticated engineering materials and molded shapes and designs, as well as in conventional molding material systems. This new and improved electrically heated molding torpedo embodying the present invention is particularly useful in injection molds of the type known as "runnerless" molds, where the plastic or similar material is continuously maintained at molding temperatures within crucial special melt transfer passages of the mold, and runners are not ejected from the mold with the molded parts, as distinguished from runner-type molding where the runner is ejected from the mold or trimmed from the molded part at the time of each shot. The entire melt flow path of a runnerless molding system requires optimum temperature uniformity and control. Areas of excessive temperatures within the plastic delivery system and mold burn or cause a more rapid degradation of the melt material. Inadequate heat can also result in blocked or inadequate melt flow, poor molded parts or other weaknesses in the system or parts. Heat uniformity is particularly important at each startup of the tool because existing melt material within the system is in direct contact with the heated surfaces for extended periods of time.

The device embodying the present invention is made from a crushable ceramic core cut to length and slotted at the its two opposed ends to provide a pair of axial holes, and element wire is wound on the core looped into the holes. Conductor pins are inserted into each end of the core in mechanical contact with the resistance wire. Spacers are placed on the ends of the core over the pins, and a hypodermic type thermocouple well is inserted along slots on the spacers coaxially with the core. Preferably, the resistance wire is wound in spirals having closer spacing at the ends of the core and wider spacing intermediate the core ends, and preferably the core has a flat side, with spacers being similarly formed, except with a slot aligned and coaxial with the flat side of the core.

The entire core-wire-thermocouple well assembly is placed into an aperture arranged in a closed ended tool steel blank which has been shaped to accommodate these components in a selected position, whereupon the voids around the assembly are filled with granular ceramic fill material. The entire assembly may then be sealed shut. This torpedo body assembly is then swaged to a smaller diameter, thus increasing the density of the ceramic insulation and compressing the components to a solid integral body having high heat transfer and electrical insulation characteristics eliminating all voids with the leads and thermocouple well extending out of the swaged body.

The swaged torpedo body preferably is then machined to a selected rough diameter. The tip of this torpedo body assembly may be machined to provide a pointed end remote from the lead exists. The area of the torpedo body where the bend is desired is then heated to a high temperature, and placed within a set of shaped forming dies which are then closed under pressure to form the desired bend. Preferably, the bend is in a direction away from the thermocouple well and flat side of the core so that these members are at the heel of the torpedo when bent. The heating of the piece during bending makes the torpedo body, thermocouple well, wire winding and pins ductile and permits them to be bent without breaking.

After the bent and formed molding torpedo is constructed as describe, it may be inserted into a suitable head or mold body and may be welded into place. Additional machining can be carried out on the assembly to prepare for its end use. Lead ends can be prepared for lead attachment and the desired leads can be secure. The thermocouple can be installed and any desired lead protection can be placed on the completed assembly. Heads can be cast onto the end of the assembly, if desired.

OBJECTS AND ADVANTAGES OF THE INVENTION

The objects and advantages of the invention include the following:

To provide a formed molding torpedo and a method for making the same of the character described.

To provide a molding torpedo which can supply heat throughout a larger portion of the active length of the component than conventional molding torpedoes.

To provide a molding torpedo which can deliver heat by conduction directly to any attached head to be used for mounting and/or melt transfer.

To provide internal leads for a molding torpedo which are fully isolated from the melt stream without requiring welding or brazing or intermediate members between the torpedo body and the outer wall of the flow passage.

To provide lead exits for a molding torpedo which are an integral part of the molding torpedo and can be located at a distance from the sealing surface interfaces, thus allowing maximum integrity for the leads and avoiding leakage and damage to the leads or contaminating the internal torpedo heating element.

To provide an integral electrically heated torpedo which has a lead exit capable of being easily machined to accept protective caps and lead protection systems.

To provide an internal thermocouple well assembly which can be formed to accommodate an internal hypodermic tube thermocouple assembly in the same operation as in the formation of the heater body assembly, allowing a mineral insulated thermocouple to be installed into the tip of a formed molding torpedo from the power lead exit area to smoothly follow the internal curvature of its bend, thus providing structure for the leads and thermocouple protecting the exiting electrical components from physical damage at a location remote from the sealing surface interfaces of the molding torpedo.

To provide a formed molding torpedo which is constructed to permit its body to be filled, compacted and compressed, formed and bent without damaging the functions of its ceramic and electrical components.

To provide a formed molding torpedo which is efficient in use and can be made according to a method which is simple, economical and efficient to perform.

These and other objects and advantages of the invention will become more apparent as this description proceeds, taken in conjunction with the accompanying drawings.

BRIEF DESCRIPTION OF THE DRAWINGS

In the drawings:

FIG. 1–17 are a series of schematic sketches, each showing a suggested successive step in the performance of the method embodying the present invention for the manufacture of the novel formed molding torpedo disclosed in this application, as follows:

FIG. 1 is a side elevational view of a ceramic core for use in this invention.

FIG. 2 is a cross-sectional view of the core taken on line 2—2 of FIG. 1.

FIG. 3 is a side elevational view of the core shown in FIG. 1 which has been wound with electrical resistance wire.

FIG. 4 is a view similar to FIG. 3, with the addition of leads and conductor pins attached to the ends of the windings.

FIG. 5 is a view similar to FIG. 4, with the addition of ceramic spacers at each end of the core and a cold core and lead extensions at one end of the core.

FIG. 6 is a sectional view of a ceramic spacer, taken on line 6—6 of FIG. 5.

FIG. 7 is a side elevational view of a wound core with leads, pins and spacers attached and a thermocouple well in position.

FIG. 8 is a sectional view of the assembly shown in FIG. 7, with the cold core attached, shown during its insertion into the cooperating tool steel blank.

FIG. 9 is a sectional view of the core assembly and blank taken on line 9—9 of FIG. 8, FIG. 10 is a sectional view of the core assembly installed in the blank.

FIG. 11 is a view similar to FIG. 10, with the addition of granular insulation filling voids in the blank.

FIG. 12 is a sectional view of the core and blank assembly swaged and trimmed and its tip machined.

FIG. 13 is a cross sectional view of the FIG. 12 assembly, taken on line 13—13 of FIG. 12.

FIG. 14 is a sectional view of the finished formed molding torpedo embodying the present invention.

FIG. 15 is a sectional view similar to FIG. 14, welded into a suitable mold head.

FIG. 16 is a sectional view similar to FIG. 15, with leads attached and thermocouple inserted into the thermowell, and a lead protector disc installed.

FIG. 17 is a cross-sectional view of the completed formed torpedo assembly, taken on line 17—17 of FIG. 16.

FIG. 18 is a sectional view showing the completed novel molding torpedo in typical sprue bushing for direct gating to a cavity from a machine nozzle, with protected leads.

FIG. 19 is a sectional view similar to FIG. 18, showing the novel molding torpedo as a typical hot manifold bushing for use in a hot runner mold.

FIG. 20 is a sectional view of a pair of molding torpedoes embodying the present invention arranged for use in standard and stack mold configurations of insulated runner molds and in hot runner molds.

FIG. 21 is a sectional view of a pair of molding torpedoes embodying the present invention arranged in a hot manifold system where the molding torpedoes are mounted directly in a manifold.

DESCRIPTION OF PREFERRED EMBODIMENTS

Figure 22:
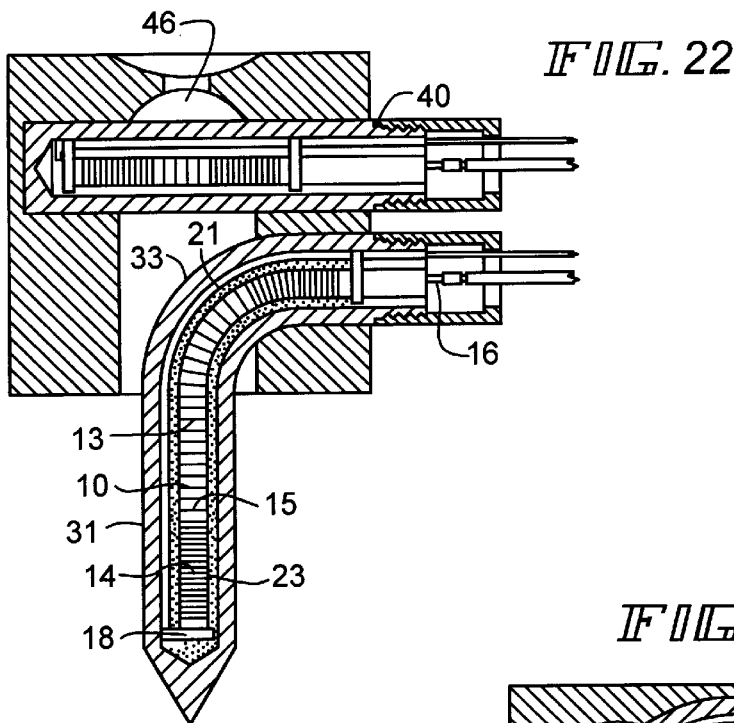
FIGS. 22 is a sectional view of the novel molding torpedo and a conventional straight torpedo illustrating a method of direct gating to a cavity from a machine nozzle.

With reference to the accompanying drawings and particularly to FIGS. 1 through 17, respectively, where in FIG. 1 a ceramic core 10 is cut to length and axially slotted (FIG. 2) with two parallel holes 11 extending its length, the ceramic core 10 preferably having a flat side 12 as shown. A strand of electrical resistance element wire 13 is wound onto the core 10, with its spiral windings 14 adjacent the ends of the core being spaced closer together than the spiral winding 15 arranged inwardly from the ends of the core (see FIG. 3). As shown in FIG. 4, conductor pins 16 are inserted into the core 10, making intimate mechanical contact with the wire 13 looped at 17 into each of the holes 11.

In FIG. 5, at the ends of the windings 14 a cold core 19 is arranged on the end of the core 10 wound with resistance wire 13. These spacers 18 (see end view FIG. 6) have a slot 20 arranged co-axially on the flat side 12 of the core 10. Preferably, the cold core 19 may be configured with a cross section like the core 10. A hypodermic tube or thermowell 21 is placed in the slots 20 and arranged along the axis of and parallel to the core 10 (see FIG. 7), but held spaced apart from it. The end 22 of the thermowell 21 remote from the cold core 19 and conductor pins 16 is closed, as by bending of the thermowell over the related end spacer 18, as shown in FIG. 7.

The wound core assembly 23 is then inserted into an aperture 24 formed in a tool steel blank 25, as shown in FIG. 8, the right angle cross section of this assembly being illustrated in FIG. 9. The ceramic spacers 18 maintain the clearances of the wound core assembly 23 in the aperture 24 of the tool blank 25 and hold the hypodermic tube thermowell 21 in the proper position shown in FIGS. 8–12. Voids in the wound core assembly 23 nested in the aperture 24 are then filled with a granular ceramic fill material 26 (see FIG. 10) and the lead end 27 is then sealed shut with plastic sealant material 28 (see FIG. 11), such as hot melt glue or a plastic disc.

The entire filled blank and wound core assembly as shown in FIG. 11 is swaged to a small diameter to increase the internal density of the ceramic insulation and components to level approaching that of a sold. This swaging procedure insures high heat transfer rates for the ceramic material and secures the electrical connection between the element wire 13 and the conductor pins 16, essentially making the swaged filled blank and wound core assembly an integral solid body.

After swaging as described above, making the assembly components into a integral body, the solid torpedo body 30 shown in FIG. 12 may have its tip 29 machined to a point or other shape and the body machined as desired. This solid torpedo body 30 is next bent in a forming tool under heat and pressure to form the bent torpedo body 31 shown in FIG. 14 and has a heat transfer portion 31a separated from a lead exit end portion 32, separated by a heel 33 on one side of the torpedo device. This bent torpedo body 31 may be inserted into a suitable head 34 and welded in place, see FIG. 15, or alternatively, additional machining can be carried out on the assembly to prepare for its end use, as for example, in FIG. 16 leads 35 may be attached and a thermocouple 36 may be installed into the thermowell 21. A lead protector disc 37 shown in plan view FIG. 17 may be installed on the lead exit end of the assembly.

In FIG. 18, the completed formed molding torpedo 31 is shown installed in a typical sprue bushing 38, illustrating how the gate 39 is heated uniformly from its entry into the mold and the torpedo leads 35 and thermocouple 36 are protected and remote from the melt flow. As shown in FIG. 18, the end 40 of the bent torpedo remote from the heating element may be machined with a thread 41 and a bushing 42 may be threaded over the end to positively protect the leads 35, not only from damage by the melt stream and its resultant heat, but also damage resulting from manipulation of the mold, torpedo, sprue and other components during set up and other movement and adjustment of the parts.

Figure 23:
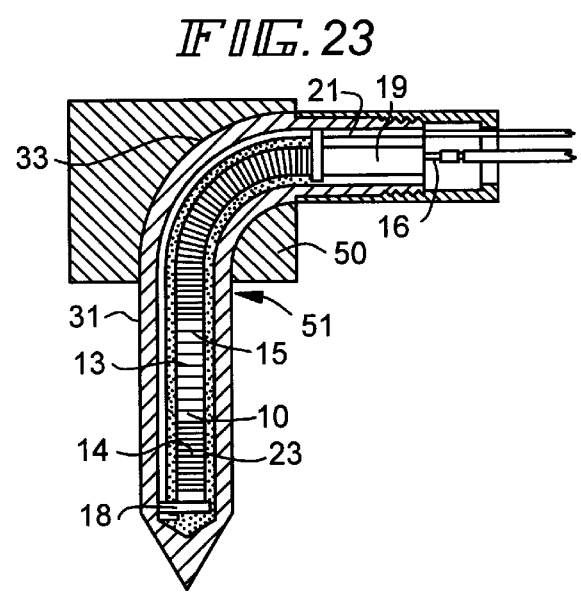
FIG. 23 is a sectional view of the novel molding torpedo for use in an insulated runner mold application where the torpedo heats the gate and sprue areas.

FIG. 19 is similar to FIG. 18, except the formed molding torpedo 31 is installed in a typical hot manifold bushing 43. The illustration of FIG. 20 shows a pair of formed molding torpedoes 31a and 31b arranged with their hot areas in line for use in the insulated runner 44 of a stack mold. Another alternative arrangement of formed molding torpedoes 31c and 31d in FIG. 21 illustrates how the torpedoes can be set in opposed pairs in a split manifold 45 thus permitting the gate 46 to be split into a pair of runners 47, making the mold more compact for the delivery of melt flow to multiple cavities within the same mold dimensions.

Where the mold requires more heat at the machine nozzle or the mold configuration requires a different architecture at the gate 46, a conventional torpedo 48 may be used with the formed molding torpedo 31 embodying the present invention to add heat at the gate. In FIG. 23, the formed molding torpedo 31 is used in an insulated runner mold 50 to heat the gate and sprue areas 51, and in FIG. 24 the formed molding torpedo 31e has an elongated body 52 making a simple torpedo capable of heating substantially all or a great portion of the runner area.

Figure 25:
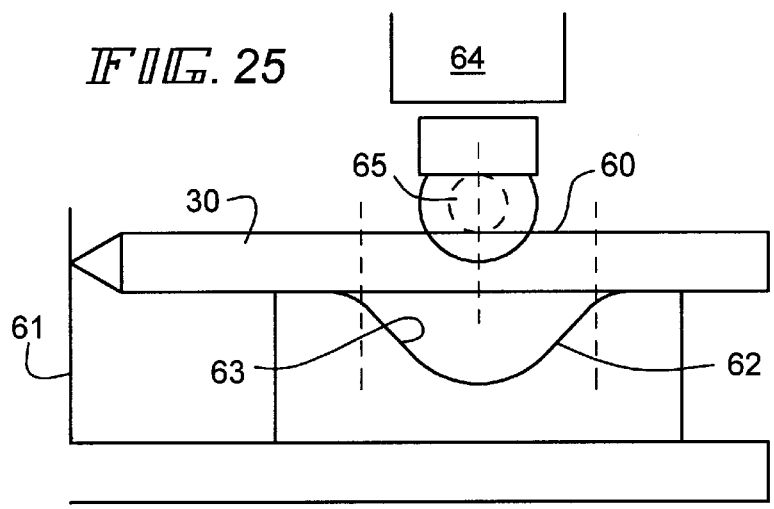
FIGS. 25–27 are schematic representations of typical steps which may be used for bending the novel molding torpedo embodying the present invention.
Figure 26:
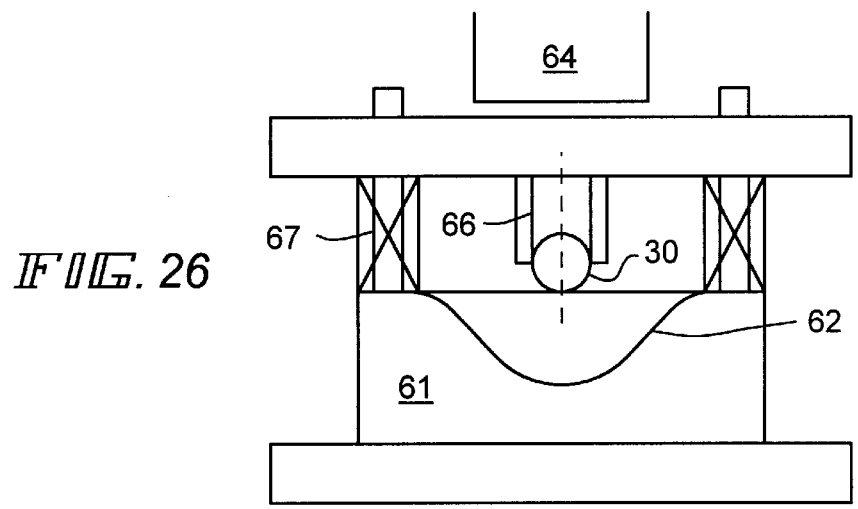
Figure 27:
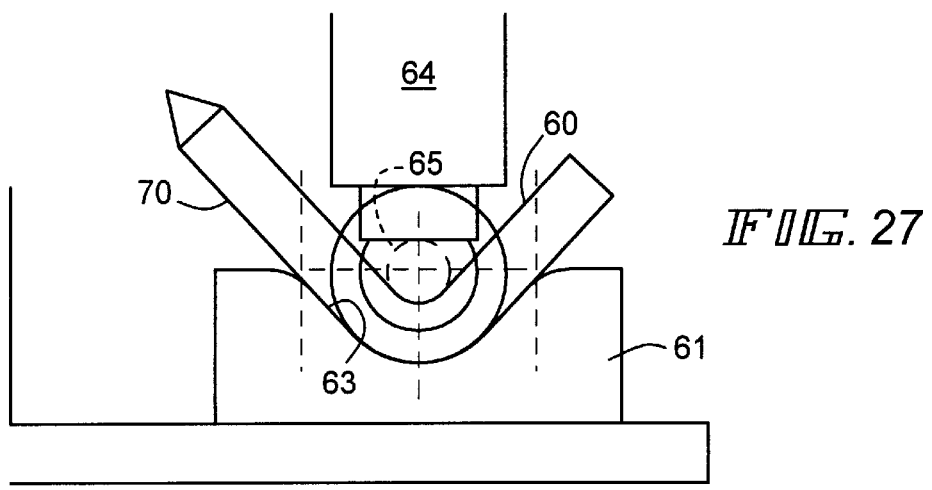

FIG. 25 illustrates how a straight solid torpedo body 30 after swaging may be formed by hot forming or hot forging process techniques by being heated in the area 60 to be bent (between the dotted lines), and placed into a holding fixture 61 having an anvil 62 for receiving the solid torpedo body 30. This anvil 62 has a curvature segment 63 corresponding to the desired curvature of the torpedo body. A hydraulic ram 64 arranged over the curvature segment 63 has mandrel 65 suitable for making the desired bend in the straight solid torpedo body 30 for creating the formed molding torpedo embodying the present invention. As shown in FIG. 26, this anvil 62 and hydraulic ram 64 set up preferably has guide pins 66 and die springs 67 for guiding the mandrel 65 into shaping position, to bend the torpedo body into the formed shape illustrated in FIG. 27. Heat and pressure is applied to the area 60 of the torpedo body to be bend in the curvature segment 63 throughout the bending operation, whereupon the bent torpedo 70 is allowed to cool.

Figure 24:
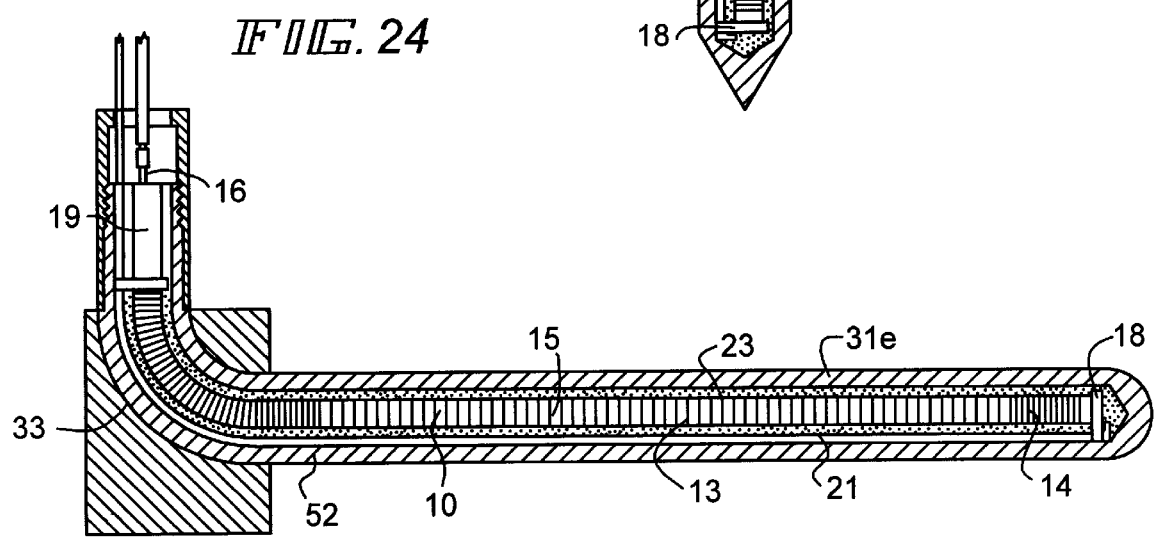
FIG. 24 is a sectional view of the novel molding torpedo for use in an insulated runner mold application where the torpedo heats the runner area.

By forming the torpedo into the shape and by the methods described, the bending action will not degrade the wire wound core or thermocouple, which due to the construction and process of forming the molding torpedo embody the invention, will withstand the manufacturing stress, without endangering the heating and electrical integrity of the product. Note that the thermowell is placed away from the direction of the bend and the thermocouple is not inserted into the thermowell until after the bending action is completed. This bending action stretches the thermowell tube without compressing it or blocking the interior tube length or interfering with the placement and operation of the thermocouple. Likewise, the flat side of the core and the wider spaced wire windings are directed away from the direction of the bend, making it less likely that the bending action will interfere with the heating and electrical integrity of the device, particularly when compacted and compressed by the swaging operation. As illustrated in FIGS. 23 and 24, it is possible to make the bend at a point there the windings are closer together, where the bending action is done with care and the swaged torpedo body has been densely formed.

Although preferred embodiments of the invention have been shown and described, the specification provided is intended to be illustrative only rather than restrictive, as details of the structures and method may be modified or changed without departing from the spirit or scope of the invention. It is not desired that the invention should be limited to the exact construction and method steps described and shown.

I claim:

1. A formed integral heated molding torpedo device adaptable for maintaining a material passing over an exposed surface thereof at a controlled elevated temperature when said device is secured in a molding member, said device comprising, in combination:

an electrical heating element,
      said heating element consisting of electrical resistance wire and an insulating core, said resistance wire being wound around said core;
   a heat conductive torpedo body,
      said electrical heating element being compacted solidly in said body to form an integral one piece unit,
   said body having
      a bore closed at its head end,
      a lead exit end remote from and disposed angularly to said head end,
      a heel area between and intermediate said ends, and
      a surface on the exterior of said body exterior in heat transfer relation with said heating element,
      said heating element adapted to effect direct beat transfer to tile torpedo body surface from the heating element,
      said heating element wire and core being arranged and bent within said heel area;
   heat transmitting insulating material densely packed in said body surrounding said heating element electrically insulating said heating element from said torpedo body; and
   insulating means sealing said torpedo body lead exit end.

2. The formed integral heated molding torpedo device recited in claim 1, wherein said core has a flat side.

3. The formed integral heated torpedo device of claim 2, wherein said torpedo body has a heel defined by the point where said portion is bent angularly to said end and the flat side of said core is arranged against said heel.

4. The formed integral heated torpedo device of claim 2, wherein a thermocouple well is arranged against the flat side of said core.

5. The formed integral heated torpedo device of claim 2, wherein said core has a longitudinal aperture and said wire extends through said aperture.

6. The formed integral heated torpedo device of claim 1, wherein said wire wound core comprises a spirally wound length of resistance wire arranged in windings, the windings at the ends of said core being spaced apart a lesser distance than the wire windings between said ends.

7. The formed integral heated molding torpedo device recited in claim 6, wherein one side of a winding at said heel is closer to another winding than another side of said winding.

8. The formed integral heated torpedo device of claim 1, wherein a thermocouple well is arranged on one longitudinal side of said core.

9. The formed integral heated torpedo device of claim 8, wherein said core has spacers arranged coaxially therewith at each longitudinal end of said core, and said thermocouple well is secured to said spacers spaced apart from said resistor wire.

10. The formed integral heated torpedo device of claim 9, wherein a thermocouple is inserted into said thermocouple well.

11. The formed integral heated molding torpedo device recited in claim 8, wherein said thermocouple well is bent along the place of said heating element and body.

* * * * *